(12) United States Patent
Brown et al.

(10) Patent No.: US 12,055,934 B2
(45) Date of Patent: Aug. 6, 2024

(54) MACHINE LEARNING FOR TRAJECTORY PLANNING

(71) Applicant: Raytheon Company, Waltham, MA (US)

(72) Inventors: Harrison A. Brown, Denver, CO (US); Darrell L. Young, Falls Church, VA (US)

(73) Assignee: Raytheon Company, Tewksbury, MA (US)

( * ) Notice: Subject to any disclaimer, the term of this patent is extended or adjusted under 35 U.S.C. 154(b) by 72 days.

(21) Appl. No.: 17/668,975

(22) Filed: Feb. 10, 2022

(65) Prior Publication Data

US 2022/0260995 A1 Aug. 18, 2022

Related U.S. Application Data

(60) Provisional application No. 63/149,813, filed on Feb. 16, 2021.

(51) Int. Cl.
*G05D 1/00* (2024.01)
*G01C 21/02* (2006.01)

(52) U.S. Cl.
CPC ......... *G05D 1/0088* (2013.01); *G01C 21/025* (2013.01); *G05D 1/10* (2013.01)

(58) Field of Classification Search
USPC ....................................................... 701/513
See application file for complete search history.

(56) References Cited

PUBLICATIONS

Chen, Yuwei, et al., "Prediction of Satellite Time Series Data Based on Long Short Term Memory-Autoregressive Integrated Moving Average Model (LSTM-ARIMA)", IEEE 4th International Conference on Signal and Image Processing, (2019), 308-312.

Mital, Rohit, et al., "A Machine Learning Approach to Modeling Satellite Behavior", IEEE International Conference on Space Mission Challenges for Information Technology (SMC-IT), (2019), 62-69.

Zayan, Mohamed, "Satellite Orbits Guidance Using State Space Neural Network", IEEEAC paper #1092, (2005), 16 pgs.

*Primary Examiner* — James M McPherson
*Assistant Examiner* — Bakari Underwood
(74) *Attorney, Agent, or Firm* — Schwegman Lundberg & Woessner, P.A.

(57) ABSTRACT

Discussed herein are devices, systems, and methods for improved trajectory planning. A method can include providing two of (i) a first value indicating a change in velocity to alter an orbit of a first object to a transfer orbit; (ii) a second value indicating a range between the first object and a second object; or (iii) a third value indicating an altitude of the first object relative to a celestial body around which the first and second objects are orbiting as input to a machine learning (ML) model, receiving, from the ML model, a holdout value, the holdout value a prediction of the value, of the first value, the second value, and the third value, that was not provided to the ML model, and providing the holdout value to an orbital planner.

14 Claims, 6 Drawing Sheets

MACHINE LEARNING FOR TRAJECTORY PLANNING

CROSS-REFERENCE TO RELATED APPLICATIONS

This patent application claims the benefit of U.S. Provisional Patent Application No. 63/149,813, filed Feb. 16, 2021, entitled "MACHINE LEARNING FOR TRAJECTORY PLANNING", which is incorporated by reference herein in its entirety.

TECHNICAL FIELD

Embodiments discussed herein regard devices, systems, and methods for trajectory planning with reduced time constraints. The trajectory planning can be informed without a physics model.

BACKGROUND

An entity typically will determine how to operate an orbiting space object using a physics-based model. The physics-based model implements mathematical equations that model orbital mechanics with very high accuracy. The accuracy comes at the cost of time and operating bandwidth.

DETAILED DESCRIPTION

Generation of training data for machine learning of spacecraft transfer trajectories has used a time and compute bandwidth consuming generation of orbital data using traditional tools, like physics-based models. In addition, planning of object orbit, including orbit transfer, includes a generation of a meaningful best guess for the physics-based models. The best guess can be generated based on intuition, experience, examples from previous orbital object maneuvers, or mathematical modeling of the system.

The physics-based models perform multiple, typically computationally complex, calculations for each orbit generated. Therefore, there is a desire for a tool that allows for faster generation of meaningful best guesses to be provided to high fidelity orbit planning tools, such as the physics-based models. Further, there is a desire for a tool that generates training trajectories at speeds that allow for prompt, effective machine learning (ML).

Teachings provide a neural orbit planner. The neural orbit planner can be trained based on provided known orbit transfers in relative frames. The neural orbit planner can then be used to generate new transfer orbits at rates that are significantly faster than the traditional methods employed in generation of the original training orbits. These transfer orbits can take the form of highly accurate medium fidelity models, which can be provided to high fidelity modeling tools as meaningful best guesses. The teachings reduce the time needed in planning of missions that include orbital planning. A gradient boosted tree (GBT) can be used in place of an NN to provide a medium fidelity guess. The GBT can operate to provide the same information, with similar results. An orbital planner with a NN supplying guesses is sometimes called a neural planner. An orbital planner with a GBT supplying guesses is sometimes called a GBT planner. The teachings provide for use of a neural planner or a GBT planner to plan spacecraft transfer trajectories in a relative frame context. More specifically, the use of either of the neural planner or the GBT planner to generate transfer trajectory burns for a chaser spacecraft in the context of its initial range from the target and from the point of view of the target.

Figure 1:
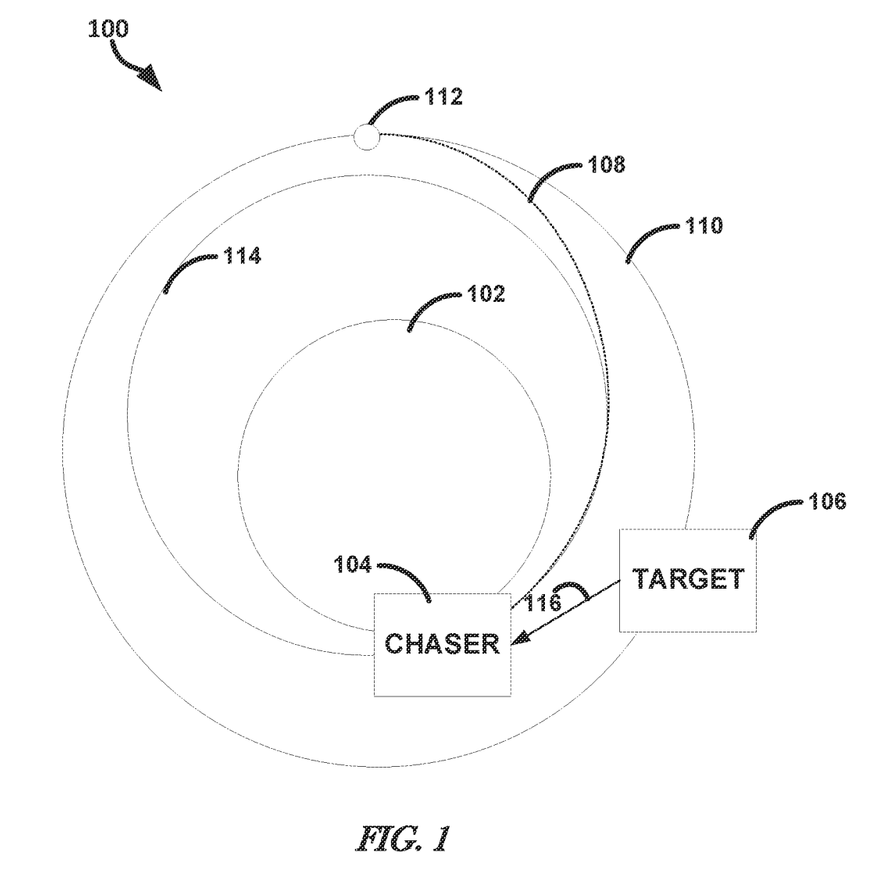
FIG. 1 illustrates, by way of example, a diagram of an orbital system for which teachings are applicable.

FIG. 1 illustrates, by way of example, a diagram of an orbital system 100 for which teachings are applicable. The system 100 as illustrated includes a celestial object 102 orbited by multiple orbiting objects 104, 106. The orbiting object 104 is travelling along a first orbital trajectory 114. The orbiting object 106 is travelling along a second orbital trajectory 110. A goal of orbital planning can be to get the orbiting objects 104, 106 to rendezvous at point 112. The goal of orbital planning can be further to reduce an amount of fuel consumed in meeting at the point 112. The rendezvous can serve to re-fuel or maintain one of the orbital objects 104, 106 or other purpose. An arrow 116 indicates a range between the orbiting objects 104, 106 from the perspective of the orbiting object 106.

Figure 2:
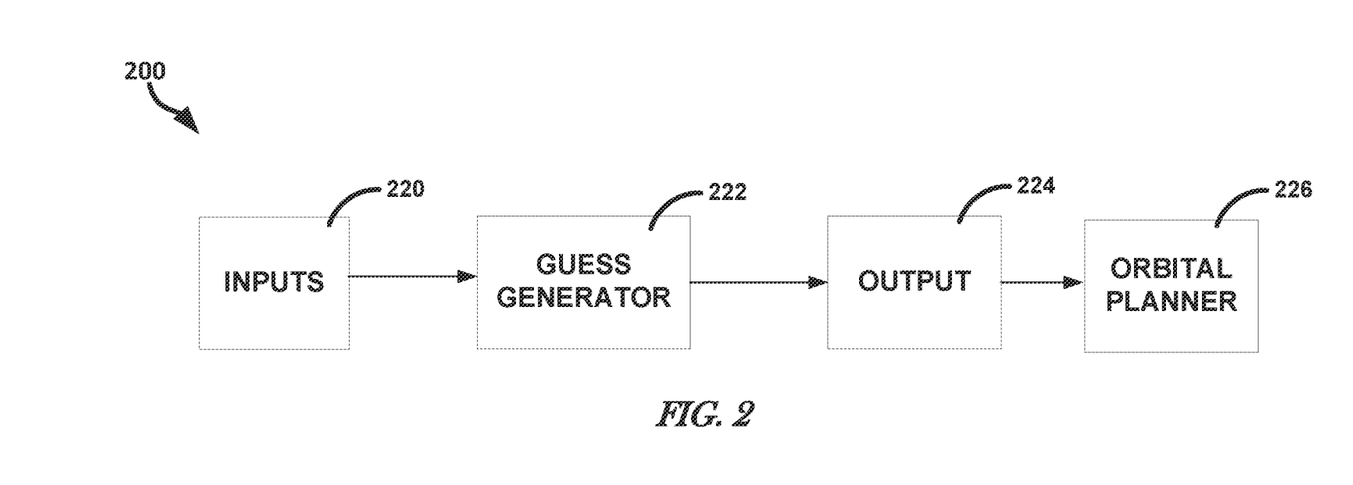
FIG. 2 illustrates, by way of example, a diagram of a flowchart for orbital planning.

FIG. 2 illustrates, by way of example, a diagram of a system 200 for traditional orbital planning. The system, as illustrated, includes inputs 220 provided to a guess generator 222 that generates an output 224 (e.g., a guess) that is used by an orbital planner 226 in generating an orbit plan. The orbital planner 226 is a high-fidelity (e.g., highly accurate) physics-based model that consumes significant time and compute bandwidth in generating the orbit plan. In general, in performing the orbital planning, a guess (the output 224 in FIG. 2) of an actual burn by the orbital object 104, 106 can be provided to an orbital planner 226.

Typically, the guess generator 222 is used to generate the output 224. The guess generator 222 can include a user providing a guess based on prior knowledge or no knowledge at all, a lower fidelity model than the orbital planner 226, or the like. The inputs 220 can include intuition, knowledge of previous, successful or unsuccessful maneuvers, known parameters of the orbital transfer, or the like. The guess generator 222 can perform mathematical equation operations on inputs 220 to generate the output 224. The inputs 220 can include a velocity change (delta-V) or corresponding burn needed to enter the transfer orbit. In the example of FIG. 1, the transfer orbit 108 is an orbit for transferring between the orbit 114 and the orbit 110. The transfer orbit 108 can be in the radial, in-track, cross-track (RIC) frame of the orbiting object 104. The inputs 220 can include time (e.g., in a coordinated universal time (UTC)

time frame) for the delta-V. The inputs 220 can include the range relative to the target (e.g., orbiting object 106) in the target's RIC frame to the orbiting object 104. The time of each step can be provided in UTC. The inputs 220 can include a delta-V to exit the orbit 108 in the RIC frame of the orbiting object 104. The inputs 220 can include the time (e.g., in UTC) that the delta-V to exit the orbit 108 occurred. The inputs 220 can include the starting and ending altitudes relative to the celestial object 102. The starting and ending altitudes can be specified in the central body frame (relative to the celestial object 102).

The output 224 can include a guess of the burn (e.g., delta-V or amount of fuel to burn) to enter the transfer orbit 108 from the orbit 114, a guess of the burn to enter the orbit 110 from the transfer orbit 108, a range between the orbiting objects 104, 106, or a combination thereof. If the guess is too far from what is actually required to perform the maneuver, the orbital planner will fail to converge or otherwise provide a non-sensical output.

Figure 3:
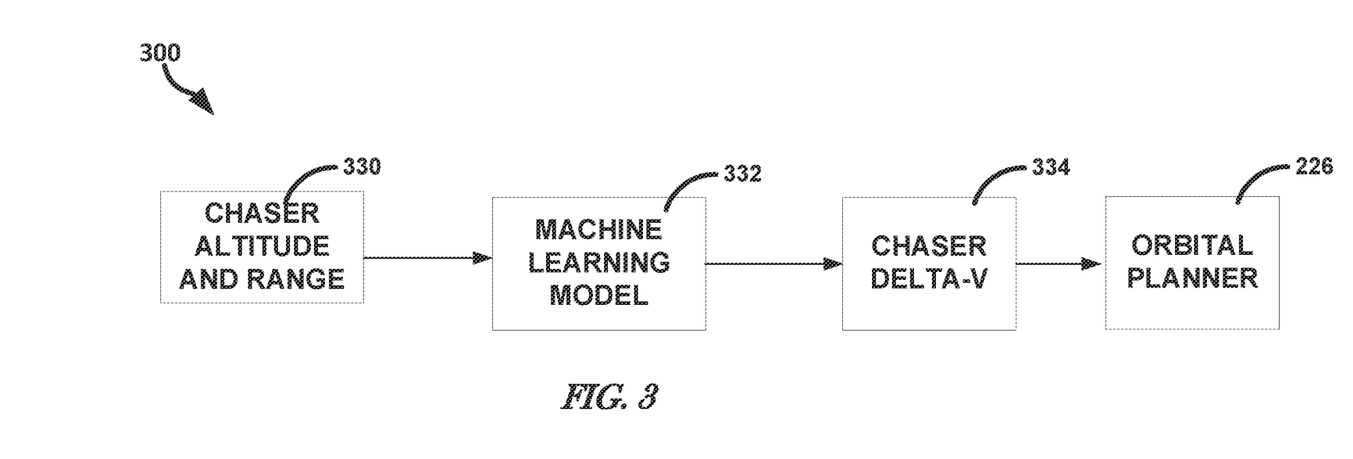
FIG. 3 illustrates, by way of example, a diagram of a flowchart for orbital planning with reduced time and compute bandwidth consumption.
Figure 4:
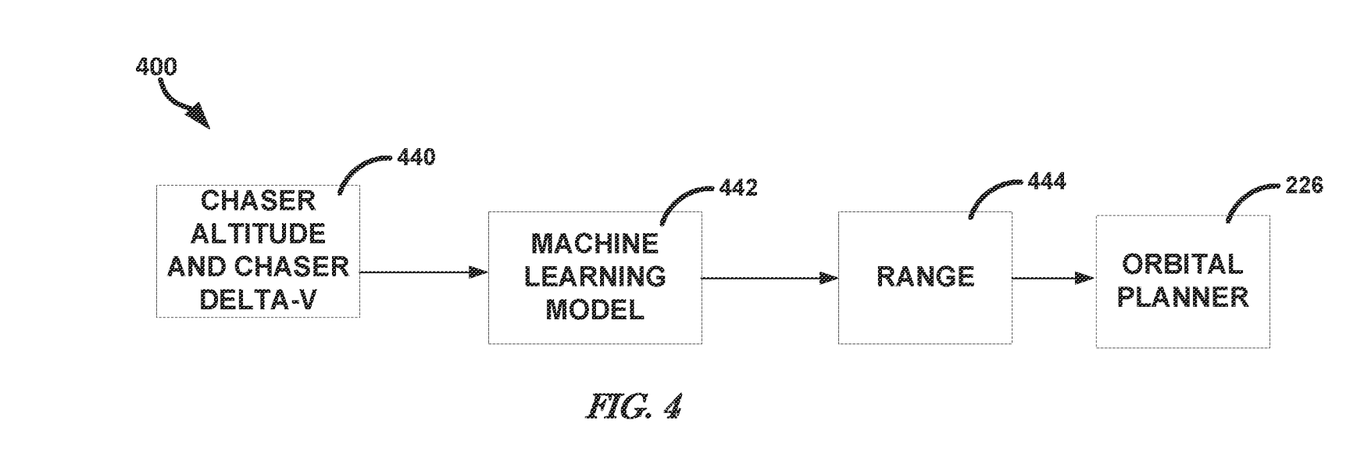
FIG. 4 illustrates, by way of example, a diagram of another flowchart for orbital planning with reduced time and compute bandwidth consumption.

Many simplifications and improvements can be made to improve computation and time consumption in generating the output 226. FIGS. 3 and 4 illustrate, by way of example, diagrams of systems that include at least some of the simplifications or improvements.

FIG. 3 illustrates, by way of example, a diagram of a system 300 for orbital planning with reduced time and compute bandwidth consumption. The system 300 as illustrated includes input 330 to an ML model 332. The ML model 332 generates an output 334 based on the input 330. The output 334 is provided as input to the orbital planner 226.

The input 330 illustrated in FIG. 3 includes altitude of the orbiting object 104 and a range (represented by arrow 116 of FIG. 1) between the orbiting objects 104, 106 (e.g., from the perspective of the orbiting object 106).

The ML model 332 can include an NN or a GBT. NNs are described in more detail elsewhere herein. A GBT is an ML technique for regression and classification problems. The output of a GBT is a decision tree, sometimes called a GBT. The GBT is generated in a stage-wise fashion that allows for optimization of an arbitrary differential loss function. Typical optimization functions include L1 and L2 loss functions. In training the GBT, a known output variable and a corresponding vector of input variables are gathered.

The pair of output variable and corresponding vector of inputs is known as a training sample. A goal of training GBT is to find an approximation of a function that minimizes an expected values of the loss function. The GBT training assumes a real-valued output and seeks the approximation of the function in the form of a weighted sum of weak learners. The GBT training typically minimizes the empirical risk (e.g., minimizes an average value of the loss function on the training set). GBT training achieves this by incrementally expanding a constant function in a greedy fashion. Choosing the best weak learner at each increment is intractable so GBT training leverages the gradient (derivative), sometimes called pseudo-residuals. Many optimizations and alternative operations to GBT are possible and within the scope of these teachings.

The output 334 of the ML model 332 in the example of FIG. 3 is the chaser delta-V. The chaser delta-V is a guess, by the ML model 332, at the change in velocity required to transfer from the orbit 114 to the orbit 110. This guess by the ML model 332 can be used as input to the orbital planner 226.

The system 300 improves upon the system 200 by replacing the guess generator 222 with an ML model 332. In verifying the delta-V, the orbital planner 226 consumes significantly more time than generation of a guess by the ML model 332. The orbital planner 226 can take on the order of minutes to verify the delta-V and another delta-V will be generated to determine convergence if a delta-V fails to converge. The ML model 332 can operate much quicker, on the order of microseconds and add some confidence in the guess generated 334. The tradeoff is in the ML model 332 generating a less accurate delta-V (on average) than would be generated using a physics-based model. The reduction in accuracy is generally inconsequential, however, due to the processing by the orbital planner 226. In general, the orbital planner 226 can generate a very accurate orbit based on a prediction that is off by a specific percentage just as well as it can generate a very accurate orbit based on a predication that is more accurate. Thus, the reduced accuracy in the prediction is virtually inconsequential to the task of orbital planning.

FIG. 4 illustrates, by way of example, a diagram of another system 400 for orbital planning with reduced time and compute bandwidth consumption. The system 400 performs inverse spacecraft trajectory planning as compared to the system 300. The forward problem of the system 300 solves for the delta-V the object 104 needs to rendezvous with the object 106 at the point 112. The inverse problem solved by the system 400 determines the range to the target given a delta-V.

The system 400 as illustrated includes input 440 to an ML model 442. The ML model 442 generates an output 444 based on the input 440. The output 444 can be provided as input to the orbital planner 226.

The input 440 illustrated in FIG. 4 includes altitude of the orbiting object 104 and a delta-V to get the orbiting object 104 from the trajectory 114 to the point 112.

The ML model 442, like the ML model 332, can include an NN or a GBT. The output 444 of the ML model 442 in the example of FIG. 4 is the range. The range is a guess, by the ML model 442, at the range between the orbiting object 104 and the orbiting object 106. This guess by the ML model 442 can be used as input (e.g., after conversion of the guess to a vector) to the orbital planner 226.

The system 400 improves upon the system 200 by replacing the guess generator 222 with the ML model 442. The ML model 442 can operate much quicker, on the order of sub-seconds, such as microseconds than the guess generator 222. Further, the ML model 442 can provide a confidence that the guess is within an accuracy required for the orbital planner 226 to converge on a solution.

A difference in the ML models 332, 442 can be realized in training. The ML model 332 is trained to determine a delta-V, while the ML model 442 is trained to determine a range. The training difference comes in the data that is withheld in training. The withheld data is what is predicted by the ML model 332, 442.

For example, the ML models 332, 442 can be trained based on valid orbital mechanics data. Valid orbital mechanics data can include Hohmann transfer data. A Hohmann transfer is an elliptical orbit path that can be used to (optimally in an impulsive sense and with some constraints) transfer between two other orbits. The Hohmann transfer output often provides a lowest possible amount of propellant in travelling between the orbits.

The valid orbital mechanics data can include delta-V to enter the transfer orbit 108 in the RIC from the perspective of the orbiting object 104; time (in UTC) the delta-V occurred, The RIC and range relative to the orbiting object 106 at each time step; the time (in UTC) of each time step;

delta-V to exit the transfer orbit 108 to the orbit 110; the time (in UTC) of the delta-V to exit the transfer orbit 108; the starting altitude of the orbiting object 104; and the ending altitude of the orbiting object 104 (relative to the celestial body 102).

The ML model 332 can be trained based on some of the orbital mechanics data and then tested using valid orbital mechanics data with the delta-V withheld. The ML model 442 can be trained based on some of the orbital mechanics data and then tested using valid orbital mechanics data with the range withheld.

To simplify the models 332, 442 time can be considered irrelevant. This assumption can be inconsequential if the trained ML model 332, 442 is provided with data of orbiting objects 104, 106 that are properly aligned for the transfer orbit 108. Another simplifying assumption can include assuming the fuel burn is entirely in-track. This allows the burn to be represented by a magnitude instead of a multi-dimensional vector. With these assumptions, the problem solved by the ML models 332, 442 becomes a problem of predicting an unknown provided two knowns.

In speeding up the computation of the unknowns, has many applications. Currently, there are over 100,000 objects being tracked in orbit and many are actively expending delta-V to modify their orbit. The amount of delta-V can be measured. These teachings can use the measured delta-V to identify a possible collision, aka, conjunctions. This can be an intended or unintentional conjunction. If the teachings indicate a possible conjunction, then a higher fidelity physics-based model can be used to refine the estimate of when and where the conjunction will occur (if at all).

Comparing GBT and NN embodiments, the GBT produces an estimate of the unknown quicker than the NN. However, the NN produces higher accuracy estimates of the unknown than the GBT. Both the GBT and the NN generate estimates on the order of a microsecond, while the physics-based model generates an estimate in about a minute or more.

Figure 5:
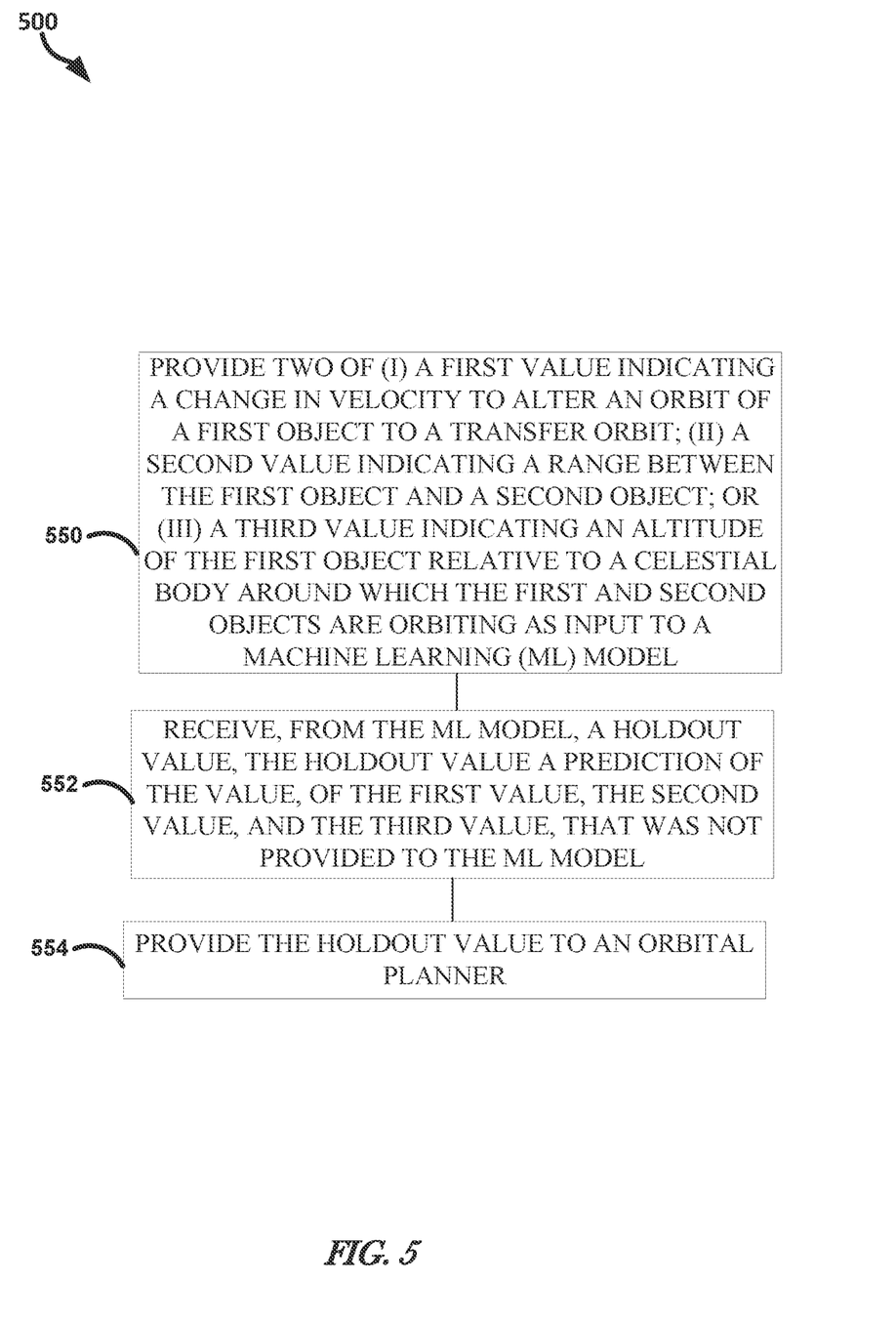
FIG. 5 illustrates, by way of example, a diagram of a method for orbital planning with reduced time and compute bandwidth consumption.

FIG. 5 illustrates, by way of example, a diagram of a method 500 for improved trajectory planning. The method 500 as illustrated includes providing two of (i) a first value indicating a change in velocity to alter an orbit of a first object to a transfer orbit; (ii) a second value indicating a range between the first object and a second object; or (iii) a third value indicating an altitude of the first object relative to a celestial body around which the first and second objects are orbiting as input to a machine learning (ML) model, at operation 550; receiving, from the ML model, a holdout value, the holdout value a prediction of the value, of the first value, the second value, and the third value, that was not provided to the ML model, at operation 552; and providing the holdout value to an orbital planner, at operation 554.

The method 500 can include, wherein the ML model is a neural network (NN). The method 500 can include, wherein the ML model is a GBT. The method 500 can further include identifying whether the holdout value indicates a collision with the first object and executing a physics-based model based on the two or more of (i) the first value; (ii) the second value; (iii) the third value, or (iv) the holdout value to generate a more accurate estimate of the holdout value.

The method 500 can include, wherein providing the two or (i) the first value, (ii) the second value, or (iii) the third value includes providing the first value and the third value and wherein the holdout value is a value indicating a range between the first object and a second object. The method 500 can include, wherein providing the two or (i) the first value, (ii) the second value, or (iii) the third value includes providing the second value and the third value and wherein the holdout value is a value indicating a change in velocity to alter an orbit of a first object to a transfer orbit. The ML model can be trained to reduce a difference between the holdout value and the value, of the first value, the second value, and the third value, that was not provided to the ML model.

Teachings use an NN planner or a GBT planner to plan orbiting object transfer trajectories. The planning can be entirely in the context of the initial range of the object from the target in the reference frame of the target. The teachings provide for the use of deep NNs and GBTs that learn from high fidelity transfer orbit simulations. The teachings provide an ability to rapidly generate mass "best guess" values for entry into a high fidelity modeling tool, greatly decreasing the time spent on generating such guesses.

In a traditional method, a bad "best guess" would cost the time it takes to run and fail to give a result, requiring a new "best guess" to be generated and another run to be conducted. Using the NN or GBT created guess, convergence is provided in one run, with a query time on the order of a millisecond, a savings of at least one run duration.

Table 1 compares some parameters of the NN and GBT solutions. In Table 1, the physics-based model was used as truth and took about 2-3 minutes to generate an estimate.

TABLE

Various parameters for NN and GBT performance. Backward indicates solving the problem as in FIG. 4, and forward indicates solving the problem as in FIG. 3.

| Method | % Error Forward | Query Time Forward | % Error Backward | Query Time Backward |
|--------|-----------------|--------------------|--------------------|----------------------|
| NN | +12.75/−10 | 91.19 us | +16/−20.5 | 77.57 us |
| GBT | +25.5/−19.5 | 2.84 us | +12.8/−23.5 | 0.85 us |

Artificial intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 6:
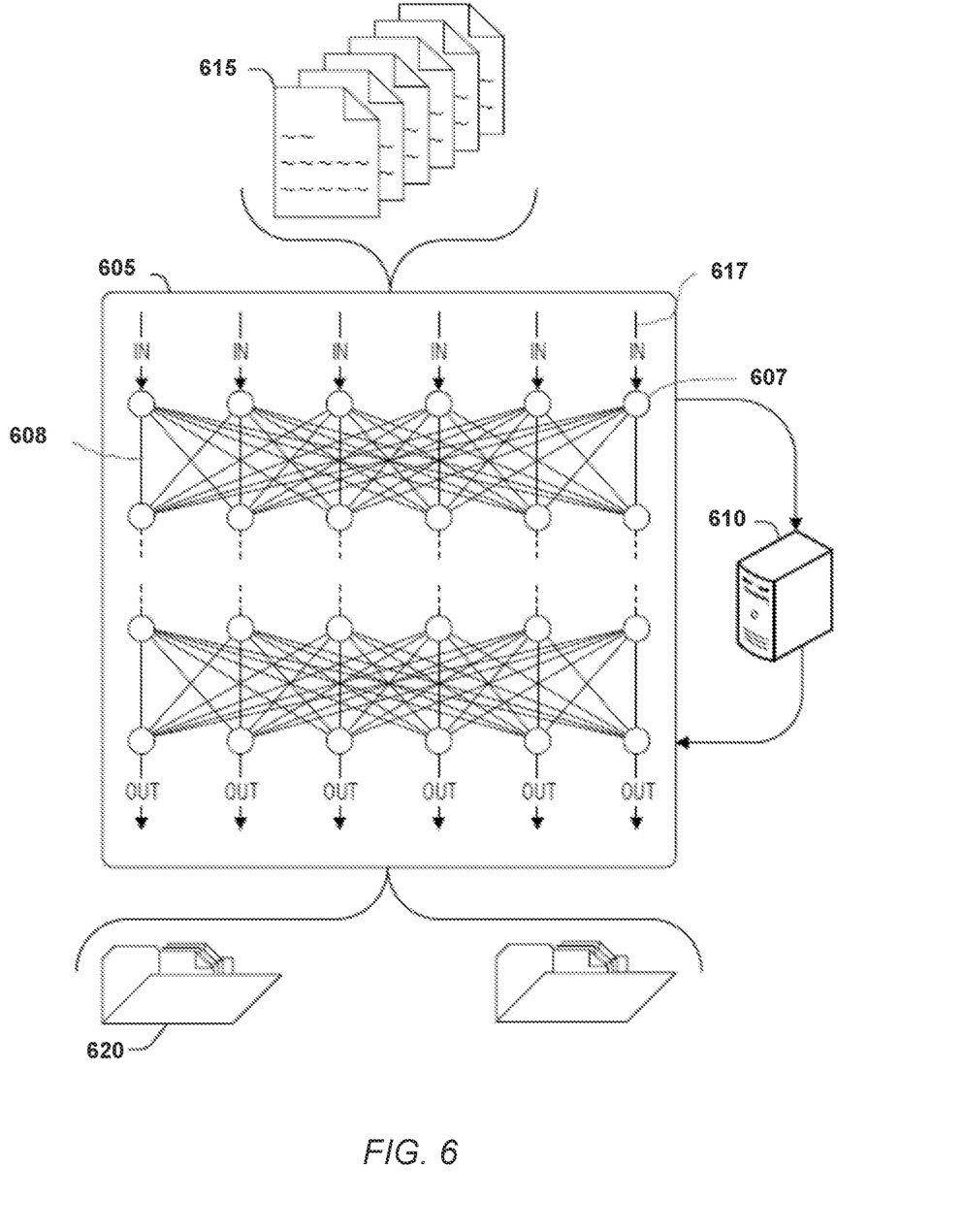
FIG. 6 illustrates, by way of example, a block diagram of an environment including a system for neural network (NN) training.

FIG. 6 is a block diagram of an example of an environment including a system for neural network training, according to an embodiment. The system includes an artificial NN (ANN) 605 that is trained using a processing node 610. The processing node 610 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 605, or even different nodes 607 within layers. Thus, a set of processing nodes 610 is arranged to perform the training of the ANN 605.

The set of processing nodes 610 is arranged to receive a training set 615 for the ANN 605. The ANN 605 comprises a set of nodes 607 arranged in layers (illustrated as rows of nodes 607) and a set of inter-node weights 608 (e.g., parameters) between nodes in the set of nodes. In an example, the training set 615 is a subset of a complete training set. Here, the subset may enable processing nodes with limited storage resources to participate in training the ANN 605.

The training data may include multiple numerical values representative of a domain, such as red, green, and blue pixel values and intensity values for an image, pitch and volume values at discrete times for speech recognition, and/or amplitude, frequency, magnitude, or the like for a vital sign, such as cardiac activity, respiratory wave, or the like. Each value of the training or input 617 to be classified once ANN 605 is trained, is provided to a corresponding node 607 in the first layer or input layer of ANN 605. The values propagate through the layers and are changed by the objective function.

As noted above, the set of processing nodes is arranged to train the neural network to create a trained neural network. Once trained, data input into the ANN will produce valid classifications 620 (e.g., the input data 617 will be assigned into categories), for example. The training performed by the set of processing nodes 607 is iterative. In an example, each iteration of the training the neural network is performed independently between layers of the ANN 605. Thus, two distinct layers may be processed in parallel by different members of the set of processing nodes. In an example, different layers of the ANN 605 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 607 (e.g., neurons) are trained independently. In an example, the nodes are trained on different hardware.

Figure 7:
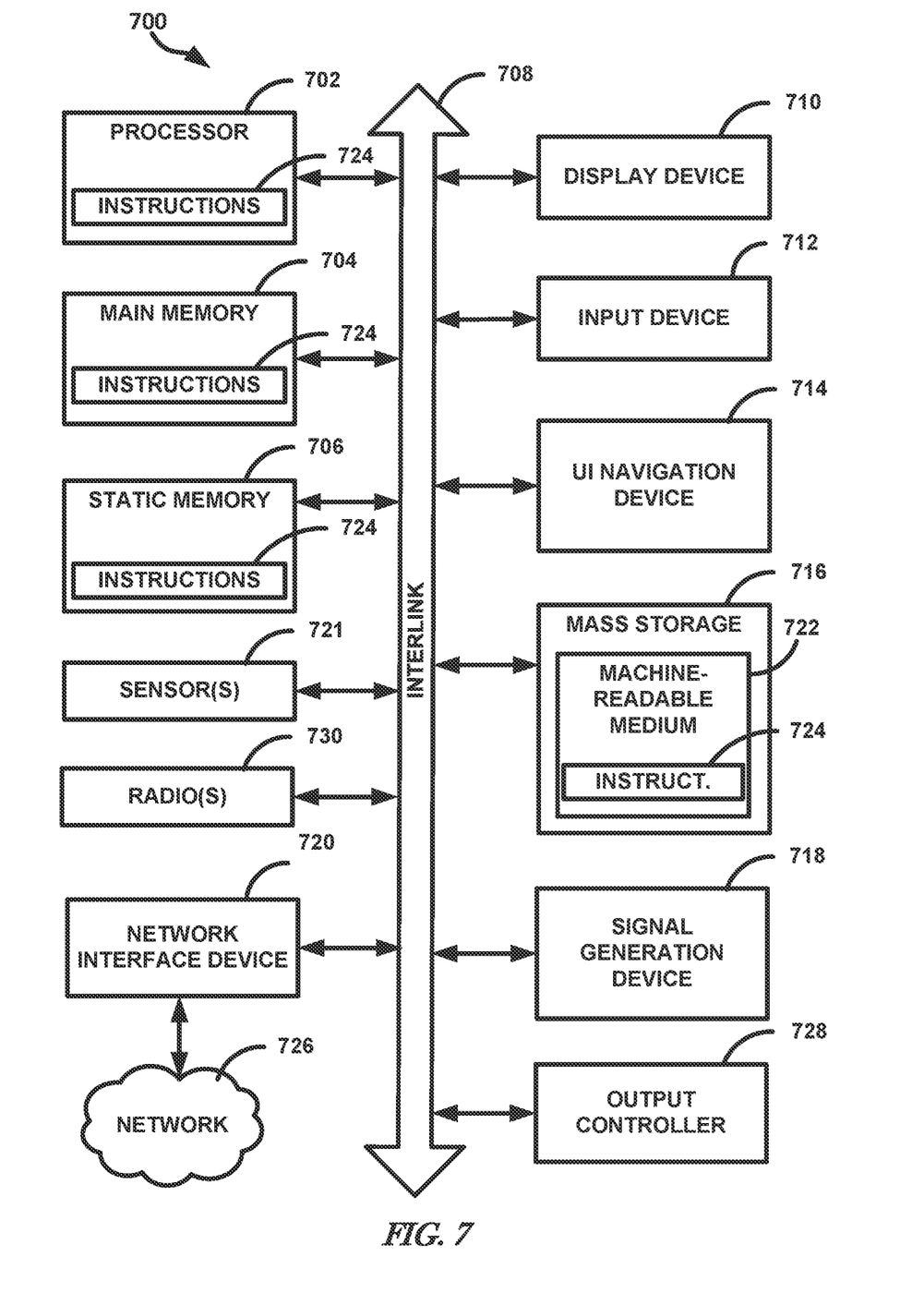
FIG. 7 illustrates, by way of example, a block diagram of an embodiment of a machine in the example form of a computer system within which instructions, for causing the machine to perform any one or more of the methodologies discussed herein, may be executed.

FIG. 7 illustrates, by way of example, a block diagram of an embodiment of a machine in the example form of a computer system within which instructions, for causing the machine to perform any one or more of the methodologies discussed herein, may be executed. One or more of the operations or components of FIGS. 1-6 can include or be implemented using one or more components of the machine 700. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a mass storage unit 716, a signal generation device 718 (e.g., a speaker), a network interface device 720, and a radio 730 such as Bluetooth, WWAN, WLAN, and NFC, permitting the application of security controls on such protocols.

The mass storage unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES AND EXAMPLES

Example 1 can include a computer-implemented method for trajectory planning, the method comprising providing two of (i) a first value indicating a change in velocity to alter an orbit of a first object to a transfer orbit; (ii) a second value indicating a range between the first object and a second object; or (iii) a third value indicating an altitude of the first object relative to a celestial body around which the first and second objects are orbiting as input to a machine learning (ML) model, receiving, from the ML model, a holdout value, the holdout value a prediction of the value, of the first value, the second value, and the third value, that was not provided to the ML model, and providing the holdout value to an orbital planner.

In Example 2, Example 1 can further include, wherein the ML model is a neural network (NN).

In Example 3, Example 1 can further include, wherein the ML model is a gradient boosted tree.

In Example 4, at least one of Examples 1-3 can further include identifying whether the holdout value indicates a collision with the first object and executing a physics-based model based on the two or more of (i) the first value; (ii) the second value; (iii) the third value, or (iv) the holdout value to generate a more accurate estimate of the holdout value.

In Example 5, at least one of Examples 1-4 can further include, wherein providing the two or (i) the first value, (ii) the second value, or (iii) the third value includes providing the first value and the third value and wherein the holdout value is a value indicating a range between the first object and a second object.

In Example 6, at least one of Examples 1-4 can further include, wherein providing the two or (i) the first value, (ii) the second value, or (iii) the third value includes providing the second value and the third value and wherein the holdout value is a value indicating a change in velocity to alter an orbit of a first object to a transfer orbit.

In Example 7, at least one of Examples 1-6 can further include, wherein the ML model is trained to reduce a difference between the holdout value and the value, of the first value, the second value, and the third value, that was not provided to the ML model.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method for trajectory planning, the method comprising:

providing two of (i) a first value indicating a change in velocity to alter an orbit of a first object to a transfer orbit; (ii) a second value indicating a range between the first object and a second object; or (iii) a third value indicating an altitude of the first object relative to a celestial body around which the first and second objects are orbiting as input to a neural network (NN) model or a gradient boosted tree model;

receiving, from the NN model or the gradient boosted tree model, a holdout value, wherein the holdout value is a prediction of the value, of the first value, the second value, or the third value, that was not provided to the NN model or the gradient boosted tree model; and providing the holdout value to an orbital planner to adjust an orbit of the orbiting object.

2. The method of claim 1, further comprising identifying whether the holdout value indicates a collision with the first object and executing a physics-based model based on the two or more of (i) the first value; (ii) the second value; (iii) the third value, or (iv) the holdout value to generate a more accurate estimate of the holdout value.

3. The method of claim 1, wherein providing the two or (i) the first value, (ii) the second value, or (iii) the third value includes providing the first value and the third value and wherein the holdout value is a value indicating a range between the first object and a second object.

4. The method of claim 1, wherein providing the two or (i) the first value, (ii) the second value, or (iii) the third value includes providing the second value and the third value and wherein the holdout value is a value indicating a change in velocity to alter an orbit of a first object to a transfer orbit.

5. The method of claim 1, wherein the NN model or the gradient boosted tree model is trained to reduce a difference between the holdout value and the value, of the first value, the second value, and the third value, that was not provided to the NN model or the gradient boosted tree model.

6. A non-transitory machine-readable medium including instructions that, when executed by a machine, cause the machine to perform operations for trajectory planning of an orbiting object, the operations comprising:
providing two of (i) a first value indicating a change in velocity to alter an orbit of a first object to a transfer orbit; (ii) a second value indicating a range between the first object and a second object; or (iii) a third value indicating an altitude of the first object relative to a celestial body around which the first and second objects are orbiting as input to a neural network (NN) model or a gradient boosted tree model;
receiving, from the NN model or the gradient boosted tree model, a holdout value, wherein the holdout value is a prediction of the value, of the first value, the second value, or the third value, that was not provided to the NN model or the gradient boosted tree model; and
providing the holdout value to an orbital planner to adjust an orbit of the orbiting object.

7. The non-transitory machine-readable medium of claim 6, wherein the operations further comprise identifying whether the holdout value indicates a collision with the first object and executing a physics-based model based on the two or more of (i) the first value; (ii) the second value; (iii) the third value, or (iv) the holdout value to generate a more accurate estimate of the holdout value.

8. The non-transitory machine-readable medium of claim 6, wherein providing the two or (i) the first value, (ii) the second value, or (iii) the third value includes providing the first value and the third value and wherein the holdout value is a value indicating a range between the first object and a second object.

9. The non-transitory machine-readable medium of claim 6, wherein providing the two or (i) the first value, (ii) the second value, or (iii) the third value includes providing the second value and the third value and wherein the holdout value is a value indicating a change in velocity to alter an orbit of a first object to a transfer orbit.

10. The non-transitory machine-readable medium of claim 6, wherein the NN model or the gradient boosted tree model is trained to reduce a difference between the holdout value and the value, of the first value, the second value, and the third value, that was not provided to the NN model or the gradient boosted tree model.

11. A system comprising:
a memory including parameters defining a neural network (NN) model or a gradient boosted tree model and instructions stored thereon;
processing circuitry coupled to the memory, the processing circuitry configured to execute the ML model and the instructions, the instructions, when executed by the processing circuitry configure the processing circuitry to:
provide two of (i) a first value indicating a change in velocity to alter an orbit of a first object to a transfer orbit; (ii) a second value indicating a range between the first object and a second object; or (iii) a third value indicating an altitude of the first object relative to a celestial body around which the first and second objects are orbiting as input to the NN model or the gradient boosted tree model;
receive, from the NN model or the gradient boosted tree model, a holdout value, wherein the holdout value is a prediction of the value, of the first value, the second value, or the third value, that was not provided to the ML model; and
provide the holdout value to an orbital planner to adjust an orbit of the orbiting object.

12. The system of claim 11, wherein the instructions include further instructions that configure the processing circuitry identify whether the holdout value indicates a collision with the first object and executing a physics-based model based on the two or more of (i) the first value; (ii) the second value; (iii) the third value, or (iv) the holdout value to generate a more accurate estimate of the holdout value.

13. The system of claim 11, wherein providing the two or (i) the first value, (ii) the second value, or (iii) the third value includes providing the first value and the third value and wherein the holdout value is a value indicating a range between the first object and a second object.

14. The system of claim 11, wherein providing the two or (i) the first value, (ii) the second value, or (iii) the third value includes providing the second value and the third value and wherein the holdout value is a value indicating a change in velocity to alter an orbit of a first object to a transfer orbit.

* * * * *